United States Patent [19]

Kirchberg et al.

[11] Patent Number: 4,935,860

[45] Date of Patent: Jun. 19, 1990

[54] PWM INVERTER CIRCUIT HAVING MODULATED DC LINK INPUT

[75] Inventors: Maurice A. Kirchberg, Freeport; Alexander Cook, Rockford, both of Ill.

[73] Assignee: Sundstrand Corporation, Rockford, Ill.

[21] Appl. No.: 421,222

[22] Filed: Oct. 13, 1989

[51] Int. Cl.$^5$ .............................................. H02M 1/12

[52] U.S. Cl. ....................................... 363/39; 363/41; 363/35; 363/37

[58] Field of Search ....................... 363/35, 37, 39, 40, 363/41, 51, 78, 79, 95, 96, 97

[56] References Cited

U.S. PATENT DOCUMENTS

| | | | |
|---|---|---|---|
| 4,387,421 | 6/1983 | Zach et al. | 363/41 |
| 4,757,434 | 7/1988 | Kawabata et al. | 363/41 |
| 4,800,478 | 1/1989 | Takahashi | 363/41 |

FOREIGN PATENT DOCUMENTS 0277065  1/1987  Japan .

*Primary Examiner*—Peter S. Wong
*Attorney, Agent, or Firm*—David H. Hitt

[57] ABSTRACT

This invention relates to a VSCF system for aircraft power generation having a DC source, the DC source producing a substantially constant voltage DC signal. An inverter is coupled to the DC source and receives the DC signal, applying a PWM pattern of switching transients to the DC signal to produce an AC signal from the DC signal. The subject invention contemplates the addition of a DC link modulator comprising a ripple generator which varies the voltage of the DC signal to eliminate short duration switching transients in the PWM pattern. Variation of the DC signal allows short duration switching transients in the PWM pattern to be lengthened, thereby avoiding physical minimum time switching limitations in the switches of the inverter. In the preferred embodiment of the invention, an inverter controller provides a synchronizing signal to the ripple generator, which is coupled to a point between the DC source and the inverter.

20 Claims, 4 Drawing Sheets

PWM INVERTER CIRCUIT HAVING MODULATED DC LINK INPUT

TECHNICAL FIELD

This invention relates to a pulse width modulated ("PWM") inverter which converts a DC signal into an AC signal. By varying a voltage of the DC signal prior to pulse width modulating the signal, incidences of short duration switching transients in the PWM pattern applied to the DC signal can be reduced or eliminated.

BACKGROUND ART

For years, PWM inverters have been employed to convert DC into AC. In many applications, it is important to carefully regulate the quality of the AC emerging from the inverter. Accordingly, it was customary in the past to define a point of regulation ("POR") downstream of the inverter at which the voltage and current of the AC signal emerging from the inverter would be sampled. The sampled voltage and current would be used to aid in the selection of appropriate PWM switching patterns to minimize distortion at the POR.

Based on the voltage and current sensed at the POR, an inverter controller would select or create in real time an appropriate PWM pattern to ensure the least distortion at the POR. Obviously, as real and reactive power factors of electrical loads coupled to the inverter change, the PWM patterns fed to the inverter would change.

A PWM pattern comprises a set of switching transients which, when applied to a DC signal via an inverter, produces alternating pulses which, when filtered, become a sinusoidal AC signal. The pulses in a PWM pattern are of varying width. Normally, the inverter can adequately reproduce the PWM pattern and thereby create an accurate sinusoidal AC signal from the DC signal. However, under some load conditions (particularly when loads are unbalanced or have particular real or reactive power components), the inverter controller selects a PWM pattern which has switching transients defining pulses which can not be faithfully reproduced by the inverter due to physical limitations of transistor switches therein. In other words, the transistor switches within the inverter have physical limitations which manifest themselves, among other ways, in a minimum allowable switching time. Thus, should the inverter switch be called upon to switch faster than it is able, it will be unable to do so and therefore will be unable to faithfully reproduce a part of the PWM pattern required to maintain the least distortion at the POR.

Prior inventions have addressed schemes for controlling current and voltage at a POR. Representative of such inventions is U.S. Pat. No. 4,757,434, which issued on July 12, 1988 to Kawabata et al. The patent to Kawabata et al is directed to a control circuit for a power conversion apparatus (e.g., inverter and cycloconverter) which produces sinusoidal alternating current (AC) power through multiple switching operations of switching devices within a cycle and supplies the power to a load. The control circuit includes a current control minor loop for controlling the instantaneous value of the output current of the power conversion apparatus in compliance with a current reference value which is determined as the sum of the load current component determined basing on the detected value of load current, and the modification current component produced by a voltage controller to current error of output line voltage of the power conversion apparatus with respect of a sinusoidal voltage reference, whereby the output voltage of the power conversion apparatus is controlled accurately to have less distortion against harmonics of the load.

Kawabata et al is designed to control the output current of the inverter. Kawabata et al fails to show any apparatus for directly dealing with physical switching limitations within the inverter itself. Therefore, Kawabata et al may be subject to the same physical limitations to which the inverter of the subject invention is prone.

The subject invention is the first to provide a DC to AC voltage inverter circuit having a variable voltage DC input such that PWM patterns having short duration switching transients are avoided. Accordingly, minimum switching time physical limitations of the switches within the inverter are avoided.

DISCLOSURE OF INVENTION

It is therefore a primary object of the invention to provide an AC power source comprising a converter for receiving a DC signal and applying a PWM pattern of switching transients to the DC signal to produce an AC signal from the DC signal and a circuit for introducing variations into the DC signal to eliminate short duration switching transients in the PWM pattern.

Another object of the invention is to provide an AC source wherein a DC signal is produced by a mechanism for producing a wild frequency AC signal coupled to a circuit for rectifying the wild frequency AC signal into the DC signal.

Still another object of the invention is to provide an AC power source wherein the converter comprises an inverter responsive to a DC signal and an inverter control output signal to provide a controlled inverter output pattern signal and an inverter controller to provide the inverter control output signal to the inverter.

A still further object of the invention is to provide an AC power source wherein a circuit for introducing a variation comprises a link signal ripple generator coupled to a point between a circuit for rectifying and an inverter.

Yet a further object of the invention is to provide an AC power source wherein an AC signal is provided to electrical loads.

Yet another object of the invention is to provide an AC power source wherein an inverter is controlled in response to an AC signal.

Still another object of the invention is to provide an AC power source wherein an inverter controller provides a synchronizing signal to a link signal ripple generator.

A final object of this invention is to provide a method for providing AC power comprising the steps of receiving a DC signal, applying a PWM pattern of switching transients to the DC signal to produce an AC signal from the DC signal and varying the DC signal to eliminate short duration switching transients in the PWM pattern.

In the attainment of the foregoing objects, the apparatus that encompasses the preferred embodiment of the invention is a variable speed constant frequency ("VSCF") system having a DC source, the DC source producing a substantially constant voltage DC signal and an inverter for receiving the DC signal and applying a PWM pattern of switching transients to the DC signal to produce an AC signal from the DC signal. The preferred embodiment of the invention includes a DC link modulator comprising an ripple generator for varying the voltage of the DC signal to eliminate short duration transients in the PWM pattern. An inverter controller provides a synchronizing signal to the injector. The inverter is responsive to an inverter control output signal to provide the AC signal. The DC source comprises a mechanism to produce a wild frequency AC signal and a circuit to rectify the wild frequency AC signal into the DC signal.

The inverter controller further comprises a circuit responsive to the AC signal to provide the inverter control output signal to the inverter. The AC signal from the inverter is filtered to produce a filtered AC signal. The filtered AC signal is then provided to electrical loads.

Other objects and advantages of the present invention will be apparent upon reference to the accompanying description when taken in conjunction with the following drawings:

BEST MODE FOR CARRYING INVENTION

Figure 1:
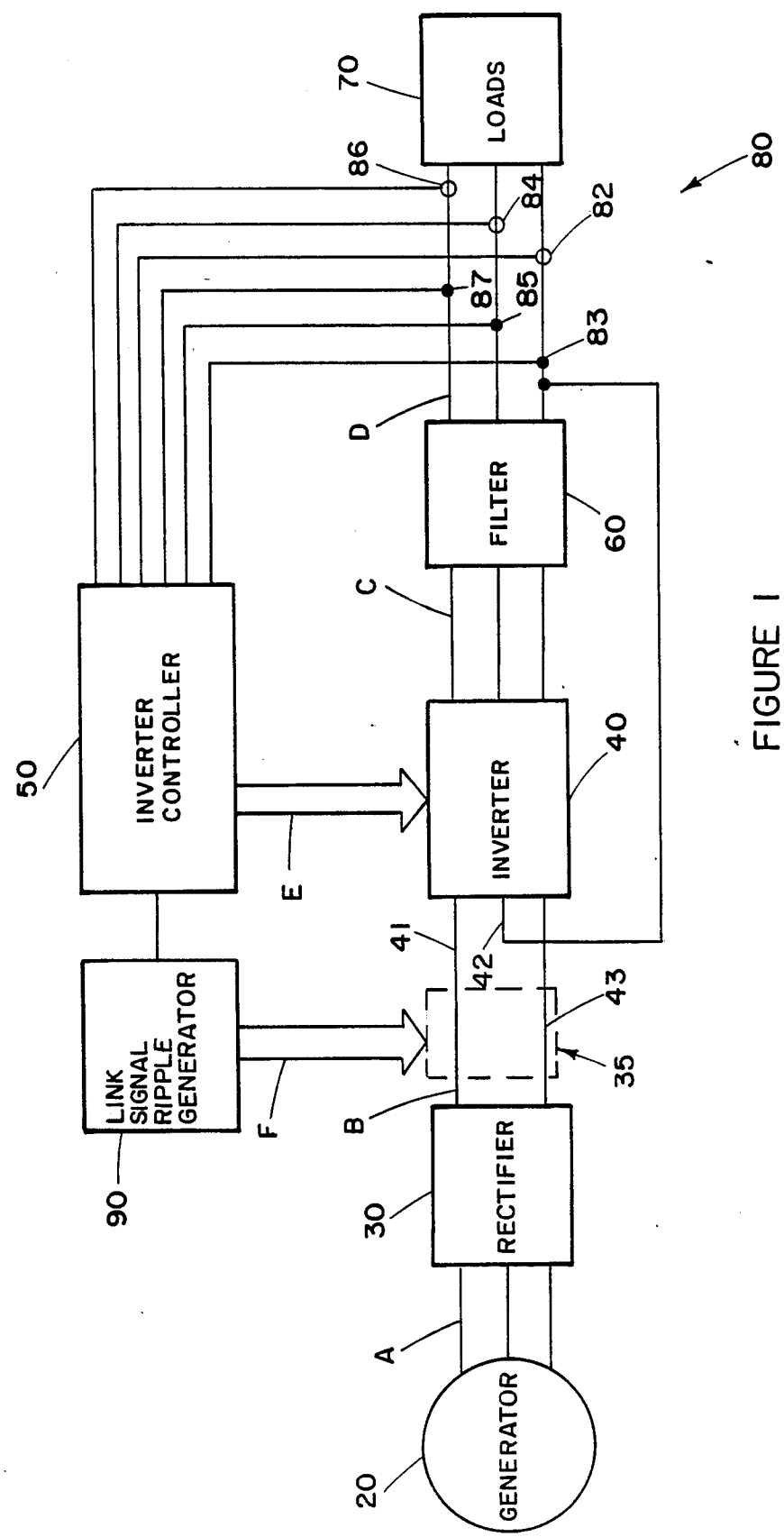
FIG. 1 is a block diagram of a VSCF system embodying the invention.

FIG. 1 is a block diagram of the variable speed constant frequency ("VSCF") system embodying the present invention. A generator 20 is mechanically coupled to a variable speed prime mover (not shown). Accordingly, the generator 20 produces power of a frequency which varies as a function of the speed of the prime mover (not shown). The resulting AC power produced by the generator 20 is therefore termed "wild frequency" AC power and is unsuitable for use by aircraft electrical systems or loads, the preferred environment for operation of the VSCF system.

Accordingly, a VSCF system is designed to convert the wild frequency AC power produced by the generator 20 into constant frequency AC power (typically at a frequency of 400 Hz) for use by aircraft electrical systems. Wild frequency AC power produced by the generator 20 is fed to a rectifier 30 which rectifies the power into DC power. The DC power is produced on a DC link 35 having a positive DC rail 41 and a negative DC rail 43. An inverter 40, under control of an inverter controller 50, produces, by pulse width modulation in the preferred embodiment, a PWM waveform from the DC power which is fed to a filter 60. The filter 60 smoothes the PWM waveform produced by the inverter 40 into a sinusoidal constant frequency AC output which is fed to aircraft electrical loads 70.

In the preferred embodiment of the invention, the wild frequency AC power output by the generator 20 is three phase AC power. The constant frequency AC power produced by the inverter 40 and smoothed by the filter 60 is likewise three phase.

In the preferred embodiment of the invention, the inverter is provided a neutral point via lead 42 which is connected, as shown, to an output phase of the filter 60.

The inverter controller 50 is controlled in response to signals sensed from a point of regulation ("POR"), indicated generally as 80, which is located downstream of the filter 60. Current is sensed by use of current transformers 82, 84, 86, which sense each of the three phases produced by the filter 60, respectfully. Likewise, voltages are sensed by taps 83, 85, 87 applied to each of the three phases produced by the filter 60. Each of the signals appearing at the current transformers 82, 84, 86 and taps 83, 85, 87 is fed to the inverter controller 50 and is used to select or generate an appropriate PWM switching pattern. Depending on the real or reactive components of the power requirements of the loads 70, the inverter controller 50 selects from memory or creates in real time a PWM pattern which, when supplied to the inverter 40 and filtered by the filter 60, produces a sinusoidal AC output waveform which is optimized to have the least distortion at the POR 80.

A PWM switching pattern is a collection of switching points, or times, which is used to operate individual transistor switches (not shown) within the inverter 40, which is of conventional design. Accordingly, when one knows the current and voltage of the POR 80 one can then determine the nature of the loads 70 (e.g. real and reactive power components and balance of the loads) and can select or generate a suitable pattern to control the inverter 40 to minimize distortion at the POR 80.

Selection or generation of PWM waveforms is well known and can be found in, for instance, U.S Pat. No. 4,527,226, which issued on July 2, 1985 to Glennon. The Patent to Glennon is commonly assigned with the subject invention and is incorporated herein by reference.

The subject invention is an extension of the known technique for inverter control described above. In that control technique, it was implicitly assumed that output from the rectifier 30 would be a pure DC signal, having no voltage variation whatsoever. The subject invention, however, introduces a link signal ripple generator 90 which introduces a variable voltage ripple onto the DC link 35. The inverter controller 50 controls the inverter 40 in response to the ripple on the DC link 35 and current and voltage values derived from the POR 80. The manner in which the ripple on the DC link 35 effects the PWM pattern supplied to the inverter 40 from the inverter controller 50 will be explained hereinafter in greater detail.

It is therefore the primary object of this invention to inject a ripple onto the DC link 35 to allow the inverter controller 50 to alter PWM switching times such that switches within the inverter 40 are not required to operate at their physical limits. Accordingly, the link signal ripple generator 90 is coupled to the DC link 35 and, in the preferred embodiment, receives a synchronizing signal from the inverter controller 50 to ensure that the ripple introduced onto the DC link 35 is synchronized with the PMW patterns fed to the inverter 40.

Figure 2:
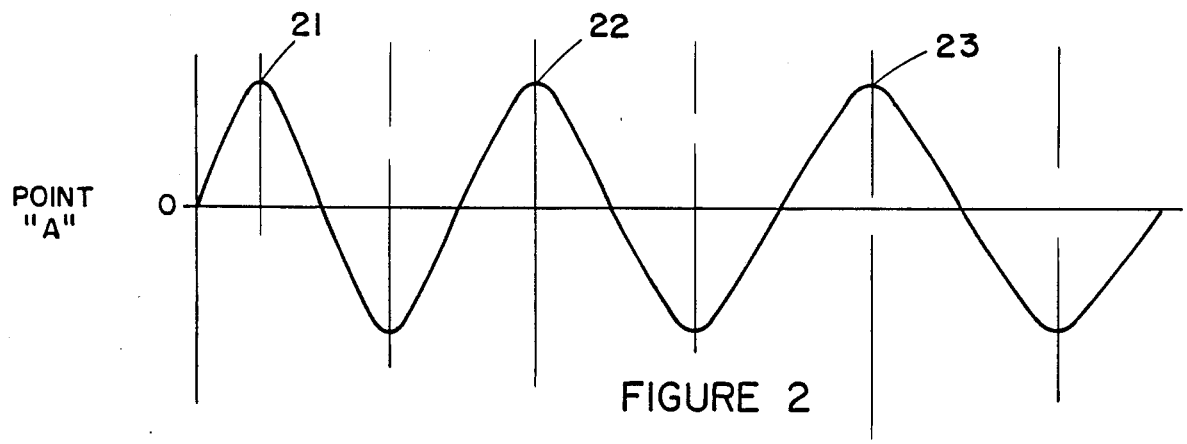
FIG. 2 represents a wild frequency AC signal taken at point "A" of FIG. 1.

FIG. 2 represents a waveform taken at point "A" of FIG. 1. The waveform is a wild frequency AC signal produced by the generator 20 of FIG. 1. The distance from peak 21 to peak 22 is illustrated to show that the distance from peak 21 to peak 22 is less than the distance from peak 22 to peak 23. This is intended to illustrate that the waveform represented in FIG. 2 is of variable frequency. Aircraft electrical loads are sensitive to changes in frequency and are therefore are unable to use the wild frequency produced by the generator 20 as shown in FIG. 2. Per FIG. 1, the waveform represented in FIG. 2 is rectified in a rectifier 30, shown in FIG. 1. Output from the rectifier 30, as previously mentioned, is in the form of a DC link 35 consisting of a positive DC rail 41 and a negative DC rail 43 leading to the inverter 40.

Figure 3:
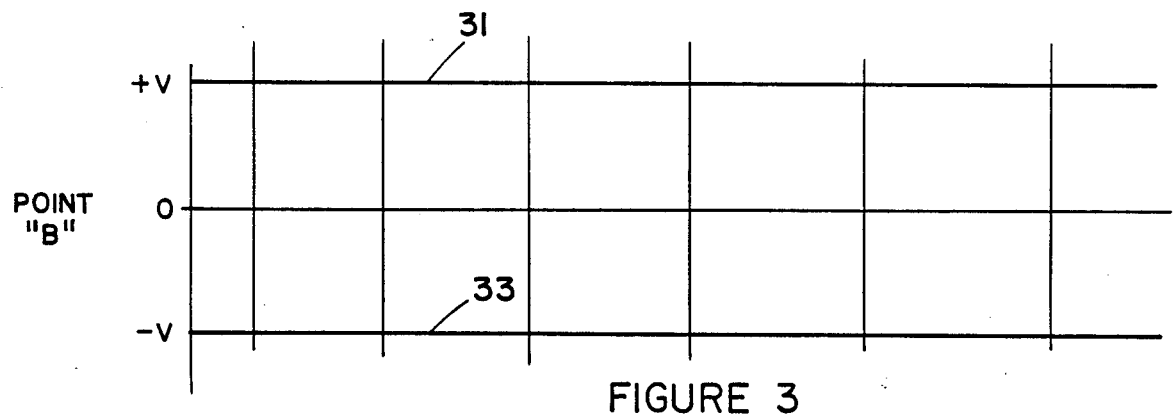
FIG. 3 represents a DC signal taken at point "B" of FIG. 1.

FIG. 3 represents a waveform taken at point "B" of FIG. 1 in a prior art system not including the subject invention. Accordingly, FIG. 3 shows a positive rail voltage 31 and a negative rail voltage 33. For purposes of this invention, it is assumed that output from the rectifier 30 of FIG. 1 is an ideal, unvarying DC voltage (a "stiff" DC link).

Again, for purposes of the subject invention, positive rail voltage 31 and negative rail voltage 33 are straight and unvarying.

Figure 4:
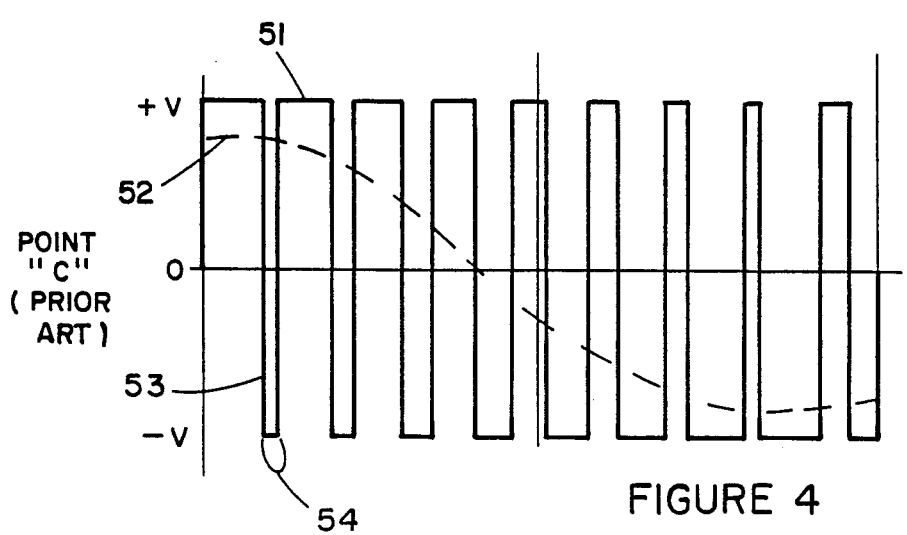
FIG. 4 represents a prior art controlled inverter output pattern signal taken at point "C" of FIG. 1 under an unbalanced load condition.

FIG. 4 represents a prior art inverter control output signal indicated generally as 51 and taken at point "C" in FIG. 1. The signal 51 comprises a plurality of switching points which define positive and negative pulses of varying widths. The pulses direct switches in the inverter 40 of FIG. 1 to modulate the DC link 35 to produce an AC waveform when filtered. That waveform is sinusoidal as represented by a dotted line 52 corresponding to the signal 51. During operation, the VSCF system must supply power to loads having different real and reactive power requirements. Accordingly, the inverter controller 50 of FIG. 1 must store, or generate in real time, PWM patterns which are optimized to provide minimum harmonic distortion at the POR 80 for particular operating conditions (i.e. a particular real or reactive power load). The different real and reactive power components of the loads are sensed at the POR 80 as shown in FIG. 1. Accordingly, in response to signals sensed at the POR 80, the inverter controller 50 produces an inverter control output signal which is used to control switches (not shown) within the inverter 40 of FIG. 1. The unmodified signal 51 is applied to the unvarying or "stiff" DC link to produce a constant frequency AC waveform.

However, it is to be noted that there are certain regimes of real and reactive power factors in the loads 80 of FIG. 1 that demand PWM waveforms containing excessively short duration switching transients. For example, FIG. 4 contains a negative pulse 53 which has a width 54. Typically, transistors, as used in the preferred embodiment of the invention, have minimum switching times on the order of 7 microseconds. Accordingly, if the width 54 is less than 7 microseconds, a transistor in the inverter 40 would fail to faithfully reproduce the narrow width 54 of the pulse 53. Instead, the width 54 of pulse 53 would be greater than that called for. The result would be that the PWM pattern proximate the pulse 53 would weigh more heavily in favor of the negative rail of the DC link than is appropriate. Accordingly, the AC waveform produced by the filter 60 would not be as heavily weighed toward the positive rail as it should be.

Figure 5:
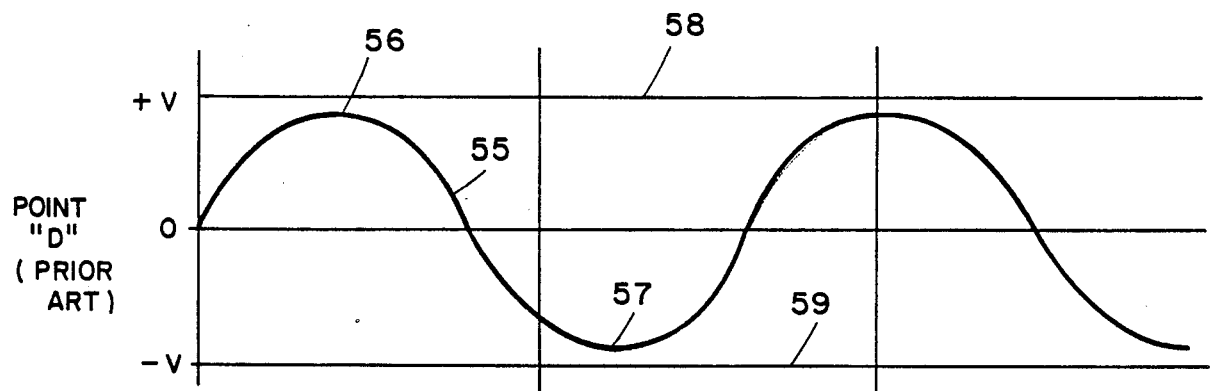
FIG. 5 represents the prior art controlled inverter output pattern signal of FIG. 4 taken at point "D" of FIG. 1 as filtered under an unbalanced load condition.

FIG. 5 shows a prior art filtered output waveform 55 resulting when the PWM pattern of FIG. 4 is applied to the inverter 40 and filtered by the filter 60 of FIG. 1. The waveform 55 has antinodes 56, 57, among others not referenced. Note that these antinodes 56, 57 fall short of nominal rail voltages 58, 59. This is because the PWM waveform 51 of FIG. 4 was distorted by the physical limitations of the switches within the inverter 40 of FIG. 1. Again, it is the object of the subject invention to eliminate the need for short duration switching transients, thereby relieving the inverter 40 of FIG. 1 of the need to faithfully reproduce such transients.

Figure 6:
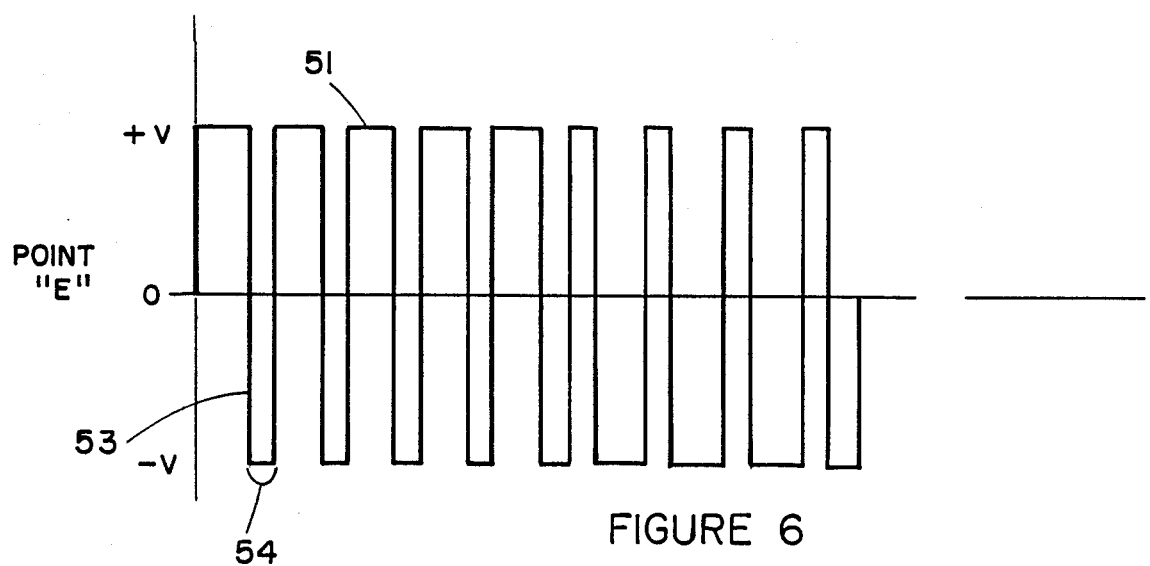
FIG. 6 represents an inverter control output signal taken at point "E" of FIG. 1.

FIG. 6 shows a PWM waveform 51 which is the same as that shown in FIG. 4. Again, the PWM waveform 51 may be stored or created by the inverter controller 50 of FIG. 1.

Figure 7:
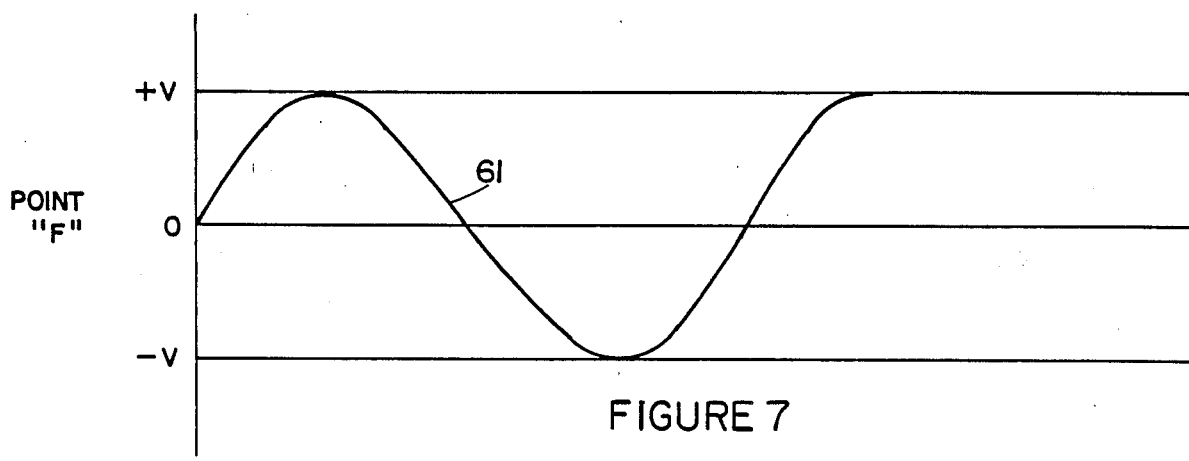
FIG. 7 represents a voltage variation as provided by a ripple generator to a DC link taken at point "F" of FIG. 1.
Figure 8:
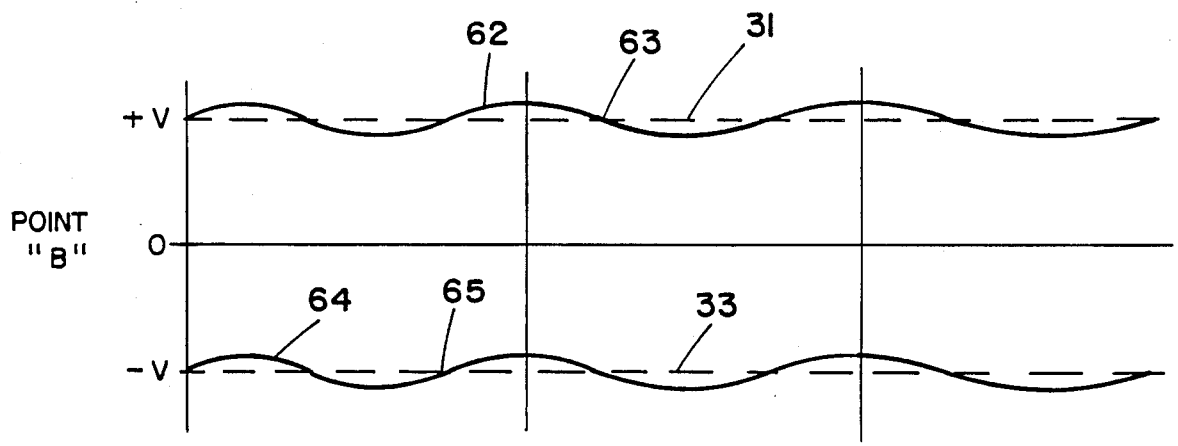
FIG. 8 represents the DC link as varied by the voltage variation of FIG. 7 taken at point "B" of FIG. 1.

Referring now to FIG. 7, the link signal ripple generator 90 of FIG. 1 produces a rippled voltage, represented by a sinusoidal waveform 61. Referring to FIG. 8, the sinusoidal waveform 61 of FIG. 7 is applied to the DC link 35 of FIG. 1 to produce a DC signal which has a variable voltage ripple superposed on it. Accordingly, FIG. 8 shows the positive DC rail voltage 31 and the negative DC rail voltage 33 of FIG. 3, along with ripple voltages 62, 64 superposed upon the positive voltage 31 and the negative voltage 33 by action of the link signal ripple generator 90 of FIG. 1. The frequency of the ripple 62, 64 of FIG. 8 is 400 Hz in the preferred embodiment. The ripple 62, 64 is synchronized with the PWM pattern such that short duration positive pulses are applied to the DC link when the ripple 62 causes the voltage of the DC link to be at a minimum. Conversely, long duration positive switching transients in the PWM pattern are applied to the DC link when the ripple 62 is at a maximum. On the negative side, short duration negative switching transients are applied to the DC link when the ripple 64 is at a maximum (least negative voltage). Conversely, long duration negative switching transients are applied to the DC link when the ripple 64 is at a minimum (greatest negative voltage). It should be noted that long duration positive transients in a PWM pattern coincide with short duration negative transients. Accordingly, the ripple 62 and the ripple 64 are in phase with one another. During nodes of the PWM pattern, when positive and negative pulses are of approximately equal duration, the ripples 62 and 64 are at midpoints, designated 63 and 65.

Figure 9:
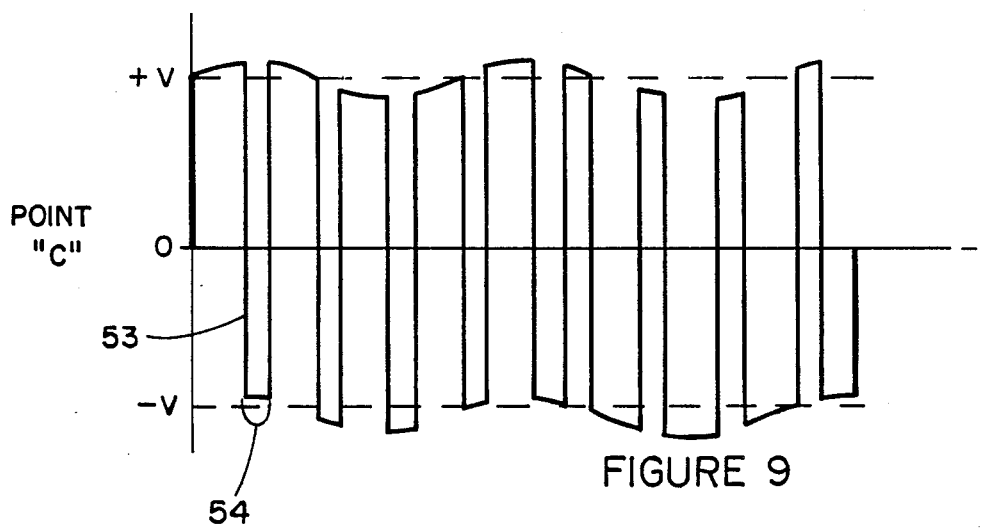
FIG. 9 represents the varied DC signal of FIG. 8 as further modulated by the inverter control output signal of FIG. 6 taken at point "C" of FIG. 1.

FIG. 9 shows the PWM waveform of FIG. 6 as adjusted to account for the ripple 62, 64 of FIG. 8. It is to be noted that the pulse 53 of FIG. 6 is reflected to a corresponding pulse 53 in FIG. 9. The width 54 of the pulse 53 in FIG. 6 likewise corresponds to width 54 in FIG. 9. Note that, because the ripple 64 of FIG. 8 produces a lower voltage on the negative rail of the DC rail than the nominal voltage 33 of FIG. 8, the width 54 of FIG. 9 is wider than the width 54 of FIG. 6. The amount of power that is stored within the negative pulse 53 of FIG. 9 is similar to the power that is stored within the pulse 53 of FIG. 6. But, because the pulse 53 is of lower voltage is FIG. 9, its width 54 can be correspondingly greater. The converse is true of a wide positive pulse in the PWM waveform which is made taller and therefore narrower.

Figure 10:
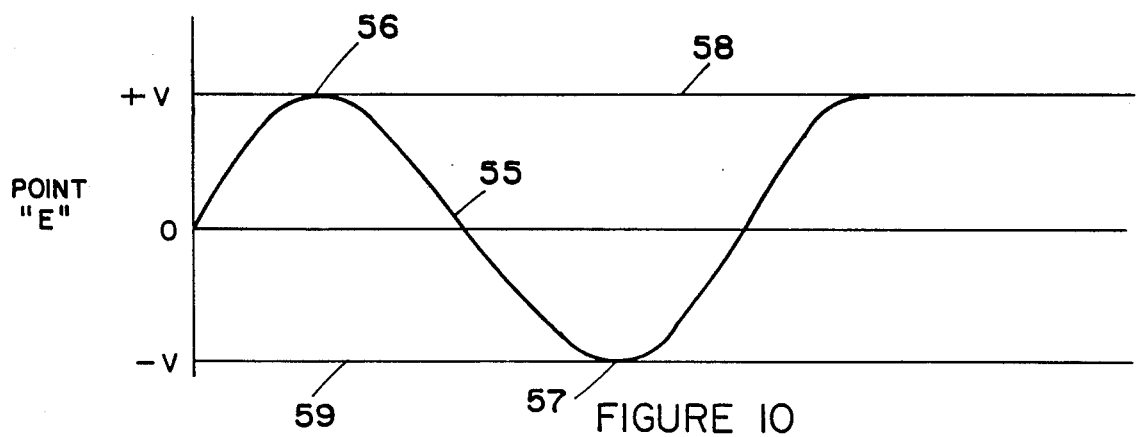
FIG. 10 represents a filtered output signal free of distortion under an unbalanced load condition taken at point "E" of FIG. 1.

Referring now to FIG. 10, shown is a filtered fundamental output waveform 55 produced by the filter 60 of FIG. 1. The waveform 55 of FIG. 10 has antinodes 56, 57 as did the waveform 55 of FIG. 5. However, because the inverter 40 can now accurately reproduce the PWM waveform required for the particular load condition, the antinodes 56, 57 are at the appropriate nominal voltages 58, 59.

As an example of the benefit arising from application of the subject invention, a half bridge 400 Hz inverter operating with a DC to peak AC voltage ratio of 1.07:1 and generating 7 pulses per half cycle requires a minimum pulse width of 7 microseconds. By the addition of a few volts of ripple to the DC link, the minimum pulse requirement can be increased to 12 microseconds.

From the foregoing description it is apparent that the invention described provides a novel AC power source comprising a converter for receiving a DC signal and applying a PWM pattern of switching transients to the DC signal to produce an AC signal from the DC signal and a circuit for introducing variations into the DC signal to eliminate short duration switching transients in the PWM pattern.

Although this invention has been illustrated and described in connection with the particular embodiments illustrated, it will be apparent to those skilled in the art that various changes may be made therein without departing from the spirit of the invention as set forth in the appended claims.

I claim:

1. An AC power source, comprising:
   converter means for receiving a DC signal and applying a PWM pattern of switching transients to said DC signal to produce an AC signal from said DC signal; and
   means for varying said DC signal to eliminate short duration switching transients in said PWM pattern.

2. The AC source as recited in claim 1 wherein said DC signal is produced by means for producing a wild frequency AC signal coupled to means for rectifying said wild frequency AC signal into said DC signal.

3. The AC power source as recited in claim 2 wherein said converter means comprises:
   (a) inverter means responsive to said DC signal and an inverter control output signal to provide a controlled inverter output pattern signal, and
   (b) inverter control means to provide said inverter control output signal to said inverter means.

4. The AC power source as recited in claim 3 wherein said means for varying comprises link signal ripple generator means coupled to a point between said means for rectifying and said inverter means.

5. The AC power source as recited in claim 4 wherein said AC signal is provided to electrical loads.

6. The AC power source as recited in claim 5 wherein said inverter means is controlled in response to said AC signal.

7. The AC power source as recited in claim 6 wherein said inverter control means provides a synchronizing signal to said link signal ripple generator means.

8. In a VSCF system having a DC source, said DC source producing a substantially constant voltage DC signal and inverter means for receiving said DC signal and applying a PWM pattern of switching transients to said DC signal to produce an AC signal from said DC signal, a DC link modulator, comprising:
   means for varying said voltage of said DC signal to eliminate short duration switching transients in said PWM pattern.

9. The DC link modulator as recited in claim 8 wherein inverter control means provides a synchronizing signal to said means for varying.

10. The DC link modulator as recited in claim 9 wherein said inverter means is responsive to an inverter control output signal to provide said AC signal.

11. The DC link modulator as recited in claim 10 wherein said DC source comprises means to produce a wild frequency AC signal and means to rectify said wild frequency AC signal into said DC signal.

12. The DC link modulator as recited in claim 11 wherein said inverter control means comprises means responsive to said AC signal to provide said inverter control output signal to said inverter means.

13. The DC link modulator as recited in claim 12 wherein said AC signal is filtered to produce a filtered AC signal.

14. The DC link modulator as recited in claim 13 wherein said filtered AC signal is provided to electrical loads.

15. A method for providing AC power, comprising the steps of:
   receiving a DC signal;
   applying a PWM pattern of switching transients to said DC signal to produce an AC signal from said DC signal; and
   varying said DC signal to eliminate short duration switching transients in said PWM pattern.

16. The method as recited in claim 15 wherein said DC signal is provided by means for producing a wild frequency AC signal coupled to means for rectifying said wild frequency AC signal into said DC signal.

17. The method as recited in claim 16 wherein inverter control means provides an inverter control output signal to inverter means to produce said AC signal from said DC signal.

18. The method as recited in claim 17 wherein link signal ripple generator means varies a voltage of said DC signal to eliminate said short duration switching transients in said PWM pattern.

19. The method as recited in claim 18 wherein said inverter control means provides a synchronizing signal to said link signal ripple generator means, said link signal ripple generator means being coupled to a point between said means for rectifying and said inverter means.

20. The method as recited in claim 19 wherein said AC signal is filtered and provided to electrical loads.

* * * * *